(12) United States Patent
Joret et al.

(10) Patent No.: US 9,777,598 B2
(45) Date of Patent: Oct. 3, 2017

(54) FLATTENED NACELLE OF A TURBOJET ENGINE

(71) Applicant: AIRCELLE, Gonfreville l'Orcher (FR)

(72) Inventors: Jean-Philippe Joret, Beuzeville (FR); Xavier Bouteiller, Le Havre (FR); Xavier Cazuc, Le Havre Rouelles (FR); Pierre Caruel, Le Havre (FR)

(73) Assignee: AIRCELLE, Gonfreville l'Orcher (FR)

(*) Notice: Subject to any disclaimer, the term of this patent is extended or adjusted under 35 U.S.C. 154(b) by 514 days.

(21) Appl. No.: 14/471,307

(22) Filed: Aug. 28, 2014

(65) Prior Publication Data
US 2014/0369829 A1  Dec. 18, 2014

Related U.S. Application Data

(63) Continuation of application No. PCT/FR2013/050418, filed on Feb. 28, 2013.

(30) Foreign Application Priority Data

Mar. 2, 2012  (FR) ..................... 12 51948

(51) Int. Cl.
*F01D 25/24* (2006.01)
*B64D 29/06* (2006.01)
*B64D 33/04* (2006.01)
*F02K 1/72* (2006.01)

(52) U.S. Cl.
CPC ............. *F01D 25/24* (2013.01); *B64D 29/06* (2013.01); *B64D 33/04* (2013.01); *F02K 1/72* (2013.01); *F05D 2250/14* (2013.01)

(58) Field of Classification Search
CPC ...... F02K 1/56; F02K 1/70; F02K 1/72; F02K 1/78; F02K 1/80; F01D 25/24; B64D 33/04; B64D 29/06; F05D 2250/14
See application file for complete search history.

(56) References Cited

U.S. PATENT DOCUMENTS

| | | | | |
|---|---|---|---|---|
| 5,507,143 | A * | 4/1996 | Luttgeharm | ............ F02K 1/563 239/265.31 |
| 9,233,757 | B2 * | 1/2016 | James | .................... B64D 29/00 |
| 2009/0301056 | A1 | 12/2009 | Hatrick | |

(Continued)

FOREIGN PATENT DOCUMENTS

EP  2 278 147 A2  1/2011
FR  2 960 918 A1  12/2011

OTHER PUBLICATIONS

International Search Report dated Jun. 12, 2013 in International Application No. PCT/FR2013/050418.

*Primary Examiner* — Carlos A Rivera
(74) *Attorney, Agent, or Firm* — Burris Law, PLLC

(57) ABSTRACT

A nacelle includes an outer structure provided with a thrust reverser and a front frame, a movable cowl, and an inner structure covering a downstream section of a turbojet engine. The outer structure and the inner structure define a flow stream of an air flow. In particular, the connection of the front frame and diversion cascade of the thrust reverser which is mounted on a reduced transverse section area of the movable cowl is centered on an axis offset relative to an axis on which the connection of the front frame and the diversion cascade mounted on the remainder of the periphery of the movable cowl is centered.

12 Claims, 3 Drawing Sheets

(56) References Cited

U.S. PATENT DOCUMENTS

| | | |
|---|---|---|
| 2010/0229528 A1 | 9/2010 | Ramlaoui et al. |
| 2013/0032642 A1* | 2/2013 | Bensilum .................. F02K 1/72 239/127.1 |

* cited by examiner

FLATTENED NACELLE OF A TURBOJET ENGINE

CROSS-REFERENCE TO RELATED APPLICATIONS

This application is a continuation of International Application No. PCT/FR 2013/050418, filed on Feb. 28, 2013, which claims the benefit of FR 12/51948, filed on Mar. 2, 2012. The disclosures of the above applications are incorporated herein by reference.

FIELD

The present disclosure relates to a nacelle of an aircraft propulsion assembly provided with a thrust reverser device with flow diversion cascade.

BACKGROUND

The statements in this section merely provide background information related to the present disclosure and may not constitute prior art.

An aircraft is driven by several turbojet engines, each housed in a nacelle also hosting an assembly of auxiliary actuating devices linked to its operation and providing various functions when the turbojet engine is operating or stopped. These auxiliary actuating devices comprise, in particular, a mechanical thrust reverser device.

The propulsion assembly of the aircraft formed by the nacelle and the turbojet engine is intended to be hung to a fixed structure of the aircraft, for example under a wing or on the fuselage, via a suspension pylon.

The nacelle generally has a tubular structure comprising an air inlet upstream of the turbojet engine, a median section intended to surround a fan of the turbojet engine, a downstream section hosting the thrust reverser means and intended to surround a combustion chamber and the turbojet engine turbines, and is generally terminated by an exhaust nozzle of which the outlet is located downstream of the turbojet engine.

This nacelle can be intended to host a turbofan engine, namely a turbojet engine capable of generating a hot air flow (also called primary flow) coming from the combustion chamber of the turbojet engine, and via the rotating fan blades and a cold air flow (secondary flow) which flows outside the turbojet engine through a flow stream of the cold air flow.

An outer structure called OFS (Outer Fan Structure), hosting the thrust reverser means, and an inner structure, called IFS (Inner Fan Structure), which surrounds the engine structure on itself behind the fan, intended to cover a downstream section of the turbojet engine, both belonging to the downstream section of the nacelle, define the flow stream of the cold air flow and thus a passage section of the cold air flow.

Regarding the thrust reverser device, it is adapted, during landing of the aircraft, to improve the braking capacity thereof by redirecting forward at least one part of the thrust generated by the turbojet engine.

During this phase, it obstructs the flow stream of the cold air flow and directs the latter towards the front of the nacelle, thereby generating a counter-thrust which adds to the braking of the aircraft wheels.

FIGS. 1 to 4 show a known example of a form of a thrust reverser.

This thrust reverser 10 is composed of a fixed structure (a front frame 12, a cascade 11, a rear frame 13 and the IFS 17) and a movable structure.

More specifically, this thrust reverser 10 includes a plurality of diversion cascade 11, attached between the peripheral front frame 12 and the fixed peripheral rear frame 13 which, generally, joins together an outer panel 14 and an inner panel 15 of a movable thrust reverser cowl 16.

During operation, the reorientation of the secondary flow, in the reverse jet position, is performed by this diversion cascade 11, the movable cowl 16 having primarily a sliding function aiming to uncover or cover this diversion cascade 11, the translation of the movable cowl 16 being performed along a longitudinal axis substantially parallel to a central axis A of the turbojet engine.

Complementary blocking doors, also called flaps 18, activated by the sliding of the cowl 16, allow a closing of the flow stream 19 of the secondary flow, downstream the cascade 11 so as to allow the reorientation of the secondary flow towards the diversion cascade 11.

These flaps 18 are pivotally mounted on the cowl 16 sliding between a retracted position in which they provide, with said movable cowl 16, the aerodynamic continuity of the inner wall of the cowl 16 and a deployed position in which, in a thrust reversal situation, they obstruct at least partially the stream 19 in order to divert the secondary flow towards the diversion cascade 11 uncovered by the sliding of the cowl 16.

This thrust reverser 10 is conventionally mounted on a nacelle substantially of revolution around the central axis A of the turbojet engine.

The aerodynamic lines of the nacelle allow a mounting of identical diversion cascade 11 on the entire circumference of the stream 19.

More particularly, as illustrated in FIGS. 2, 3 and 4, the mounting of the cascade 11 is centered on the central axis A of the turbojet engine on the entire circumference of the stream 19.

More specifically, the connecting interface 20 between the front frame and the upstream end of each cascade is radially centered on the axis A just as the connecting interface 21 between the rear frame 13 and the downstream end of each cascade 11.

Thus, the radius R1 of the connecting interface 20 between the front frame 12 and the upstream end of each cascade 11 is constant for all the cascade 11 connections on the front frame 12 on the entire circumference of the stream 19, just as the radius R3 of the connecting interface 21 between the rear frame 13 and the downstream end of each cascade 11.

Moreover, as illustrated in FIGS. 3 and 4, the radius R2 of the flow diversion blades of the diversion cascade 11 defined as the radius of the inner face of each cascade 11 from the stream 19 side, is also constant on the entire periphery of the flow exhaust stream 19.

The installation of such a cascade-type thrust reverser device 10 on a turbojet engine under the airfoil becomes complicated when the maximum height constraint of the nacelle is critical due to a low ground clearance of the aircraft and proximity between the turbojet engine and the aircraft airfoil.

Such an installation further involves a sensitive management of the passage section of the cold air flow.

A reduction of the nacelle height has therefore been proposed by providing a nacelle of non revolution around the central axis A of the turbojet engine, called "flattened nacelle".

Such a flattened nacelle has reduced aerodynamic lines in the areas at twelve hour position (i.e. in the upper part of the nacelle) and at six hour position (i.e. in the lower part of the nacelle).

Such a nacelle has no impact on the effectiveness of the thrust reversal.

However, in this case, it is necessary to locally arrange the flow diversion cascade 11.

The mounting of the flow diversion cascade 11 is achieved by reducing the radius R2 of the blades of the diversion cascade 11, which, consequently, is no longer constant over the entire periphery of the stream 19.

This involves the use of diversion cascade 11 especially dedicated to areas of the reduced aerodynamic lines of the nacelle to adjust with the height of the stream or the cowl which is different at twelve hour position (i.e. in the upper part of the nacelle) and at six hour position (i.e. in the lower part of the nacelle).

The diversion cascade 11 mounted in the areas of reduced aerodynamic lines of the nacelle are therefore not interchangeable anymore with the other diversion cascade intended to be placed on the remainder of the periphery of the stream.

The manufacturing costs are multiplied due to the multiplication of the diversion cascade categories to be provided for, the associated molds and manufacturing lines as well as maintenance costs.

SUMMARY

The present disclosure provides a nacelle of which the diversion cascade are interchangeable while maintaining a low ground clearance of the aircraft and reduced dimensions of the nacelle.

The present disclosure offers the possibility to standardize the thrust reverser device regardless of the nacelle type and a nacelle in which the manufacturing and maintenance costs are reduced.

The present disclosure provides a nacelle, comprising:
an outer structure provided with a thrust reverser device and a front frame; and
an inner structure intended to cover a downstream section of a turbojet engine,
the outer structure and the inner structure defining a flow stream of an air flow of a turbojet engine,
the thrust reverser device comprising:
one movable cowl in translation along a direction parallel to a longitudinal axis of the nacelle, the cowl being capable of alternately switching from a closing position in which it provides the aerodynamic continuity of the front frame to an opening position in which it opens a passage in the nacelle intended for the air flow to be diverted, said cowl having a non-constant cross section over the periphery of the stream; and
cascade for diverting at least one part of the air flow of the turbojet engine through the passage opening, intended to be mounted on the front frame at their upstream end.

The nacelle is remarkable in that the connection of the front frame and the diversion cascade intended to be mounted on an area of the reduced cross section of the cowl is inscribed on a radius centered on an axis offset relative to the center of the radius of installation of the connection of the front frame and the diversion cascade intended to be mounted on the remainder of the periphery of the cowl.

Thanks to the present disclosure, the thrust reverser may be provided with cascade identical to each other on the entire periphery of the stream while maintaining a low ground clearance of the aircraft and a nacelle of reduced dimensions.

According to other optional features of the nacelle according to the present disclosure, taken alone or in combination:
the outer structure further comprises a rear frame on which a downstream end of each diversion cascade is mounted, the connection of the rear frame and the diversion cascade intended to be mounted on the area of reduced cross section of the cowl is inscribed on a radius centered on an axis offset relative to the center of the radius of installation of the connection of the rear frame and the cascade intended to be mounted on the remainder of the periphery of the cowl.
the relative offset of the centers of the radii of installation respective of each cascade is configured such that the radial distance of the cascade relative to their respective center is identical over the entire periphery of the stream;
the front frame comprises an element forming a support for the diversion cascade shaped to be centered on a first axis in the area of reduced section of the cowl and a second axis on the remainder of the periphery of the cowl, offset relative to the first axis;
the rear frame comprises an element forming a support for the diversion cascade shaped to be centered on a third axis in the area of reduced section of the cowl and a fourth axis on the remainder of the periphery of the cowl, offset relative to the third axis;
the upstream and/or downstream end of the cascade is shaped to be centered on a fifth axis in the area of reduced section of the cowl and a sixth axis on the remainder of the periphery of the cowl, offset relative to the fifth axis.
the second, the fourth and the sixth axes correspond to the longitudinal axis of the nacelle;
the cowl has a reduced cross-sectional area on either side of upper and/or lower beams connected to the nacelle;
the center of the radius of installation of the connection of the front frame or rear frame and the diversion cascade intended to be mounted on the reduced upper cross-sectional area of the cowl is different from the center of the radius of installation of the connection of the front frame, or respectively rear frame and the diversion cascade intended to be mounted on the reduced lower cross-sectional area of the cowl;
the diversion cascade are, at least partly, movable in translation or in rotation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
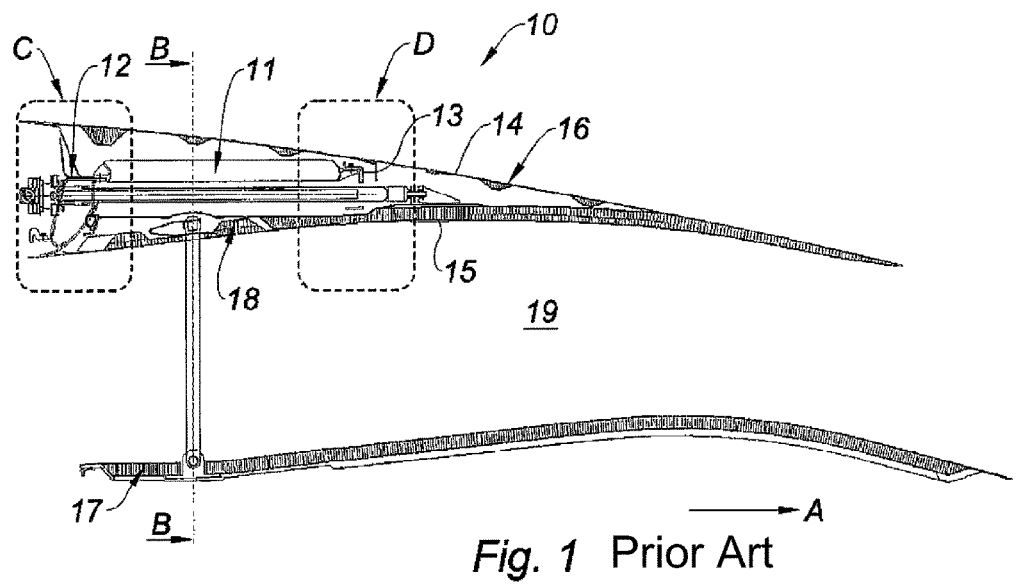
FIG. 1 is a sectional view of a thrust reverser in direct jet position, according to the prior art.
Figure 2:
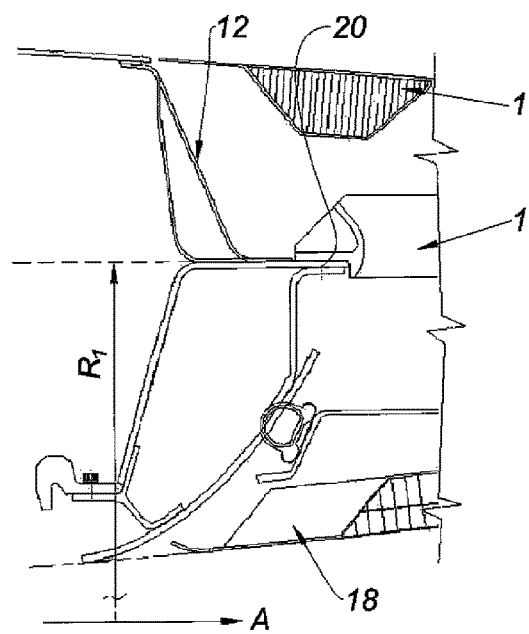
FIGS. 2 and 3 are respectively the enlarged areas C and D of FIG. 1.
Figure 3:
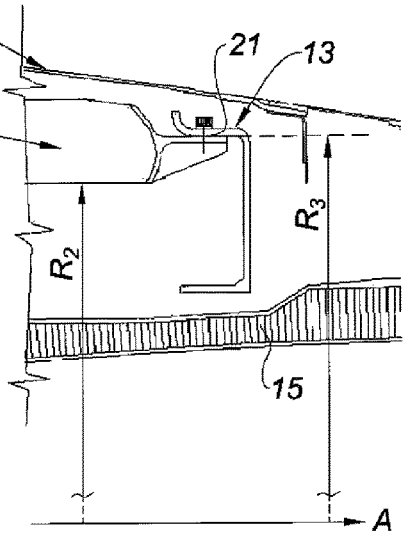
Figure 4:
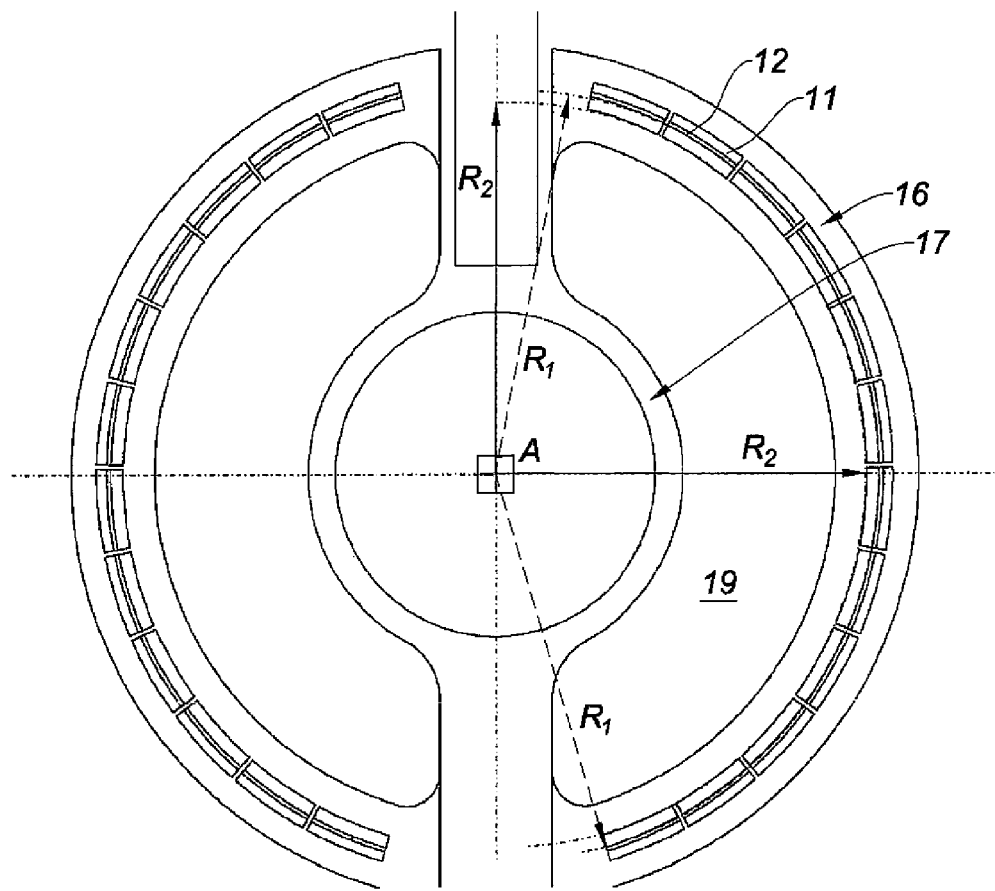
FIG. 4 is a cross-sectional view of an exhaust section of a nacelle provided with the thrust reverser of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be noted that care has been taken to define in the description a coordinate system with three axes X, Y, Z, these three axes being representative of:
- the longitudinal direction of the turbojet engine for the axis X,
- the direction leading from the longitudinal axis of the turbojet engine to the longitudinal axis of the pylon for the direction Z and,
- the orthogonal direction to X and Z for the axis Y.

In the case of a propulsion assembly mounted under an aircraft wing, the axis Z is generally vertical.

In the following description, the vertical axis will be assimilated to the axis Z, even if the aircraft propulsion assembly is mounted in another configuration, such as for example in rear fuselage, this is done for simplification purposes.

It will also be noted that the terms upstream and downstream are to be understood with regard to the direction of the air flow in the turbojet engine in direct jet normal operation.

Figure 5:
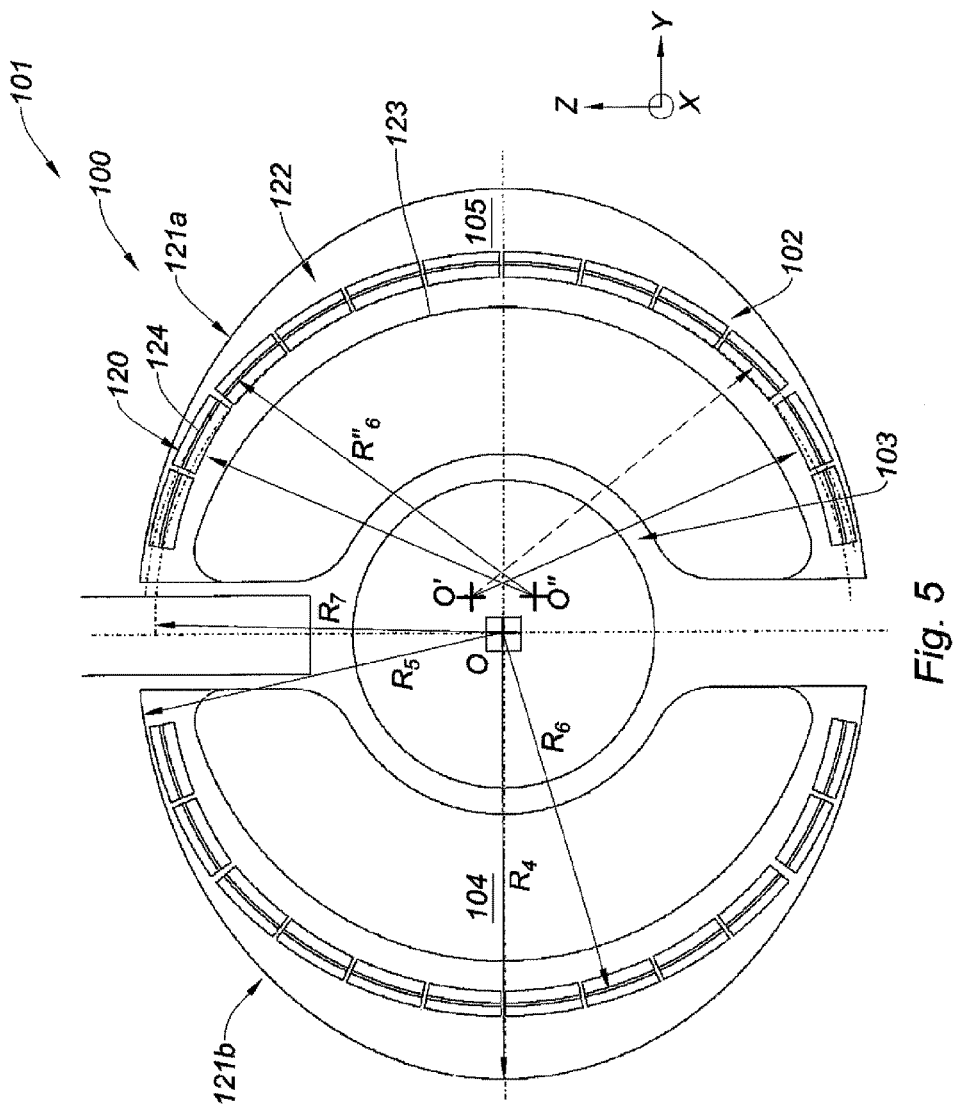
FIG. 5 is a cross-sectional view of an exhaust section of a nacelle according to a form of the present disclosure.

A thrust reverser 100 of a nacelle 101 of an aircraft propulsion assembly according to a first form of the present disclosure is shown in FIG. 5.

This thrust reverser equips a nacelle 101 of the type of the one disclosed previously with reference to FIGS. 1 to 4 with the following differences.

The downstream section of the nacelle 101 comprises an outer structure called OFS 102 including the thrust reverser device 100 and an inner structure 103 called IFS of a fairing (not illustrated) of the turbojet engine defining with the outer structure 102, a stream 104 intended for circulation and exhaust of the cold air flow.

In a first alternative form, the stream 104 of the cold air flow exhaust is of revolution around the longitudinal axis X, central axis of the turbojet engine and the nacelle.

In another alternative form, the stream 104 of the cold air flow exhaust may not be of revolution around the longitudinal axis X.

The thrust reverser 100 is, for its part, a thrust reverser with cold flow diversion cascade 120.

Thus, this reverser 100 comprises a cowl 121 movably mounted in translation, along a direction substantially parallel to the longitudinal axis X of the nacelle 101, with respect to a fixed structure of the nacelle 101 comprising at least one front frame (not shown in the figure).

This fixed front frame, intended to be mounted downstream of an outer ferrule of an engine casing of the turbojet engine, closes the thickness of the nacelle 101 upstream of the cowl 121 and directly or indirectly supports at least the flow diversion cascade 120.

The front frame includes an outer wall intended to support the outer skin of the nacelle 101, an inner wall, facing the side of the stream 104 and having a diversion edge of general rounded shape to which a torsion box is attached.

The front frame further includes an element forming directly or indirectly a support of the flow diversion cascade 120 and, more particularly, an outer ring allowing the attachment of the diversion cascade 120.

Moreover, the cowl 121 is mounted downstream of the front frame and movably relative to the latter, between a direct jet position and a thrust reversal position.

More specifically, the cowl 121 comprises an outer ferrule 122 disposed in the extension of that of the front frame in direct jet position and an inner ferrule 123 which comes in continuity of the front frame and is intended to delimit, in a direct jet position of the turbojet engine, an outer wall of the stream 104 into which flows the cold air flow.

The inner and outer ferrules 123, 122 join each other in a median area of the cowl and delimit therebetween, upstream of said median area, a central housing 105 opening toward the upstream. The housing 105 is intended to receive the secondary flow diversion cascade 120 in direct jet position, as it is shown in FIG. 5.

Moreover, the cowl 121 is adapted to alternately switch from a closing position in which it provides the aerodynamic continuity of the lines of the fixed structure of the nacelle 101 and covers the diversion cascade 120, to an opening position, downstream of the nacelle 101, in which it opens a passage in the nacelle 101 and uncovers the diversion cascade 120.

In its opening position, the cowl 121 allows the cold air flow of the turbojet engine to escape at least partially, this flow portion being reoriented towards the upstream of the nacelle 101, in particular by the uncovered diversion cascade 120, thereby generating a counter-thrust able to assist in the braking of the aircraft.

Referring more particularly to FIG. 5, the cross section, in the plane YZ, of the cowl 121 is not constant over the periphery of the stream 104.

More particularly, its shape and its dimensions are adapted so as to provide an asymmetric housing 105, of which the dimensions are larger in the horizontal direction Y than in the vertical direction Z of the cowl 121.

The cowl 121 has a flattened section on either side of upper and/or lower beams (not illustrated) secured to a suspension pylon (not illustrated) of the aircraft propulsion assembly, so as to be compatible with the low ground clearance of the aircraft and the proximity of the airfoil.

These upper and lower beams of the nacelle are vertically located at positions called six hour position and twelve hour position.

The cowl 121 has, therefore, a reduced cross-sectional area on either side of the upper and/or lower beams connected to the pylon over a limited angular distance, that is to say in the upper and/or lower part of the nacelle 101.

The height according to Z of the cowl 121 (and therefore, the housing 105) is thus reduced in the upper and/or lower part of the nacelle 101.

The cowl is formed by two curvilinear half-cowls 121a, 121b adapted so that the thrust reverser device 100 has a vertically reduced size.

More particularly, the assembly of the two half-cowls 121a, 121b has an ellipsoidal shape of which the major axis is parallel to the axis Y and the minor axis is parallel to the axis Z.

More specifically, the outer ferrule 122 of each half-cowl 121a, 121b, on the aerodynamic lines of the nacelle, is not centered on a point O which coincides with the longitudinal central axis X and is not circular in cross section while the inner structure of the nacelle 101 is centered on said point O.

Thus, the radius R5 of the outer ferrule 122 of each half-cowl 121*a*, 121*b*, on either side of the upper and/or lower beams of the pylon, is lower than the radius R4 of said outer ferrule 122 according to the axis Y.

The radii R4 and R5 are determined from the point O.

The height of the cowl 121 is thus reduced at the upper and/or lower part of the nacelle 101 defining, on these parts, a reduced cross-sectional area of the cowl 121 over the abovementioned angular distance.

Regarding the diversion cascade 120, they are disposed in an annular area, adjacent to each other. The term adjacent does not necessarily mean that the cascades 120 are disposed edge by edge.

Each cascade 120 extends between an upstream end 124 attached on the front frame and a downstream end attached on a bracket or a rear frame (not shown), fixed relative to the upper and lower longitudinal beams, not referenced in the drawing, being themselves fixed relative to the front frame.

As shown in FIG. 5, each cascade 120 is in the form of a frustoconical portion that is to say the upstream end 124 and the downstream end of each cascade 120 have a circular arc shape.

Each cascade 120 extends obliquely or in parallel relative to the axis of displacement of the movable cowl 121 according to a respectively oblique or right cone distance, forming an angle with the displacement axis X of the movable cowl 121 in the first case.

In order to mount such diversion cascade 120 on the front frame, the outer ring of the front frame has a peripheral area in the general shape of a cylinder portion, radially located at the upstream end 124 of said cascade 120, along a cone distance parallel to the axis X of displacement of the cowl 121.

The same applies at the downstream end of the cascade 120 for the rear frame to which the cascade 120 are attached.

Thus, the rear frame radially located at the downstream end 124 of said cascade 120 has a general shape of a cylinder portion and extends along a cone distance parallel to the axis X.

Depending on its position on the periphery of the cowl 121 and the stream 104, the connecting interface between the front frame and the cascade 120 is configured such that the radius of installation of the cascade 120 differs in the radial plane YZ.

More particularly, the connecting interface between the front frame and the cascade 120, in the reduced cross-sectional area of the cowl 121, is configured so as to be centered on a point corresponding to an axis offset relative to the central axis of the nacelle, as illustrated in FIG. 5.

More specifically, the connection of the front frame and the diversion cascade 120, in the reduced cross-sectional area of the cowl 121 (in the example, at twelve hour), is inscribed on a radius R"6 called "upstream connection radius", centered on an axis O" offset relative to the center O (central axis X) of the upstream connection radius R6 of the connection of the front frame and the diversion cascade 120 mounted on the remainder of the periphery of the cowl 121.

In an alternative form, the outer ring of the front frame is shaped to be centered on the first axis O" in the reduced cross-sectional area of the cowl 121 and the second axis O on the remainder of the periphery of the cowl 121.

In a second alternative form non-exclusive of the first, the upstream end 124 of the cascade 120 is shaped to be centered on the axis O" in the reduced cross-sectional area of the cowl 121 and the axis O on the remainder of the periphery of the cowl 121.

The relative offset of the centers O and O" of the radii of installation respective of each cascade 120 is configured such that the radial distance R6 and R"6 of the cascade 120 relative to their respective center is identical over the entire periphery of the stream 104 and the cowl 121.

Advantageously, the upstream connection radius of the cascade 120 is, therefore, of constant value over the entire periphery of the stream 104 of the flattened nacelle.

As illustrated in FIG. 5, to meet such a constancy, the center O" of the radius of installation of the connection of the front frame and the diversion cascade 120 mounted on the reduced upper cross-sectional area of the cowl 121 is different from the center O' of the radius of installation of the connection of the front frame and the diversion cascade 120 mounted on the reduced lower cross-sectional area of the cowl 121.

The previous presentation with reference to the upstream connection of the cascade 120 also applies to the connecting interface between the rear frame (not shown) and the downstream end 124 of each cascade 120 of which the radius called "downstream connection radius" of the cascade is constant over the entire periphery of the stream of the flattened nacelle.

Within this framework, the connection of the rear frame and the diversion cascade 120 mounted on the reduced cross-sectional area of the cowl 121 is inscribed on a radius centered on an axis offset relative to the center O of the radius of installation of the connection of the rear frame and the cascade 120 mounted on the remainder of the periphery of the cowl 121.

In another form, the rear frame comprises an element forming a support for the diversion cascade 120 shaped to be centered on a first axis in the reduced cross-sectional area of the cowl 121 and the central axis O on the remainder of the periphery of the cowl 121, offset relative to the first axis.

Moreover, the cascade 120 is configured such that the radius R7 of the inner face of the cascade 120 is, also, of constant value over the entire periphery of the stream of the flattened nacelle 101.

Thus, as illustrated in FIG. 5, in the cross-sectional area of the cowl 121, the first two cascade of the twelve hour area and the last two cascade of the six hour area are not on an installation radius of which the center is the central axis X.

The first two cascade of the twelve hour area and the last two cascade of the six hour area are, respectively, on an installation radius of which the center is O" and O'.

The number of two cascades is a non-limiting example of the present disclosure. Thus, more or less cascade may be affected by this offset installation radius.

The radius of the inner face of the cascade 120, the downstream connection radius of the cascade 120 and the upstream connection radius of the cascade 120 mounted on the reduced cross-sectional area of the cowl 121 are radii of identical value to the respective radii of the cascade mounted on the remaining periphery of the cowl 121, but their respective centers are offset relative to the central axis X/point O.

Thanks to the present disclosure, the thrust reverser 100 can be provided with cascade 120 identical to each other over the entire periphery of the stream of the flattened nacelle 101.

They have, advantageously, become interchangeable, thereby reducing the manufacturing and maintenance costs of the thrust reverser 100.

In still another form, the diversion cascade 120 may be self-supported, that is to say they are assembled by only being attached together and to the front frame, without rear frame.

In other form, the diversion cascade 120 may be at least partially translatable along a direction parallel to the central axis X of the nacelle or rotatable.

Although the present disclosure has been described with specific forms, it is obvious that it is in no way limited thereto and that it encompasses all the technical equivalents of the described means as well as their combinations if these enter within the scope of the present disclosure.

Thus, one may consider any type of cowl 121 in C-duct, D-duct or O-duct.

What is claimed is:

1. A nacelle, comprising:
   an outer structure provided with a thrust reverser device and a front frame; and
   an inner structure covering a downstream section of a turbojet engine,
   the outer structure and the inner structure defining a flow stream of an air flow of the turbojet engine,
   the thrust reverser device comprising:
      one movable cowl translating along a direction parallel to a longitudinal axis of the nacelle, the movable cowl configured to alternately switch from a closing position to an opening position, wherein in the closing position, the movable cowl provides aerodynamic continuity of the front frame, and in the opening position, the movable cowl opens a passage in the nacelle for the air flow to be diverted, the movable cowl having a non-constant cross section over a periphery of the flow stream of the air flow; and
      diversion cascades for diverting at least one part of the air flow of the turbojet engine through the passage, at least one of the diversion cascades being mounted on the front frame at an upstream end thereof by a first front frame connection, and at least another one of the diversion cascades being mounted on the front frame by a second front frame connection, the first frame connection and the second frame connection defining an arc,
   wherein the first front frame connection is mounted on a reduced cross-sectional area of the movable cowl and is centered on a first front frame axis offset relative to a second front frame axis at which the second front frame connection is mounted on a remainder of a periphery of the movable cowl is centered.

2. The nacelle according to claim 1, wherein the outer structure further comprises a rear frame on which a downstream end of each diversion cascade is mounted, a first rear frame connection of the rear frame and at least one diversion cascade being mounted on the reduced cross-sectional area of the movable cowl and is centered on a first rear frame axis offset relative to a second rear frame axis on which a second rear frame connection of the rear frame and at least another of the diversion cascades being mounted on the remainder of the periphery of the movable cowl and is centered, wherein the first rear frame connection and the second rear frame connection define an arc.

3. The nacelle according to claim 1, wherein the first front frame axis and the second front frame axis on which each diversion cascade is respectively centered is configured such that a radial distance of each diversion cascade relative to a corresponding center is identical over the entire periphery of the flow stream.

4. The nacelle according to claim 1, wherein the front frame comprises an element forming a support for at least one diversion cascade shaped to be centered on the first front frame axis in the reduced cross-sectional area of the movable cowl and the second front frame axis on the remainder of the periphery of the movable cowl.

5. The nacelle according to claim 4, wherein the second front frame axis corresponds to the longitudinal axis of the nacelle.

6. The nacelle according to claim 2, wherein the rear frame comprises an element forming a support for at least one diversion cascade shaped to be centered on a third axis in the reduced cross-sectional area of the movable cowl and a fourth axis on the remainder of the periphery of the movable cowl, the fourth axis being offset relative to the third axis.

7. The nacelle according to claim 6, wherein the fourth axis corresponds to the longitudinal axis of the nacelle.

8. The nacelle according to claim 1, wherein at least one of an upstream and a downstream end of at least one diversion cascade is shaped to be centered on a fifth axis in the reduced cross-sectional area of the movable cowl and a sixth axis on the remainder of the periphery of the movable cowl, the sixth axis being offset relative to the fifth axis.

9. The nacelle according to claim 8, wherein the sixth axis corresponds to the longitudinal axis of the nacelle.

10. The nacelle according to claim 1 wherein the movable cowl has the reduced cross-sectional area on at least one side of upper and lower beams connected to the nacelle.

11. The nacelle according to claim 2, wherein a first axis offset, on which the connection of the front frame or the rear frame and the at least one diversion cascade mounted on the reduced upper cross-sectional area of the movable cowl is centered, is different from a second axis offset on which the connection of the front frame, or respectively the rear frame, and at least one diversion cascade mounted on the reduced lower cross-sectional area of the movable cowl is centered.

12. The nacelle according to claim 1, wherein the at least one diversion cascade is, at least partly, movable in translation or in rotation.

* * * * *